United States Patent [19]

Boba et al.

[11] 4,393,187

[45] Jul. 12, 1983

[54] STAIN RESISTANT, ABRASION RESISTANT POLYURETHANE COATING COMPOSITION, SUBSTRATE COATED THEREWITH AND PRODUCTION THEREOF

[75] Inventors: Joseph Boba, Fort Lee; Robert P. Conger, Park Ridge, both of N.J.

[73] Assignee: Congoleum Corporation, Kearny, N.J.

[21] Appl. No.: 391,796

[22] Filed: Oct. 23, 1982

[51] Int. Cl.$^3$ ............................................. C08G 18/62
[52] U.S. Cl. ................................. 528/60; 204/159.16; 204/159.19; 204/159.22; 427/54.1; 427/55; 427/56.1; 428/160
[58] Field of Search ..................... 528/60; 204/159.16, 204/159.19, 159.22; 427/54.1, 55, 56.1; 428/160

[56] References Cited

U.S. PATENT DOCUMENTS 3,935,330  1/1976  Smith et al. .......................... 427/41
4,100,318  7/1978  McCann et al. ..................... 427/333
4,216,267  8/1980  Lorenz et al. ....................... 428/332

Primary Examiner—Maurice J. Welsh
Attorney, Agent, or Firm—Walter Katz

[57] ABSTRACT

A polyurethane coating, coating composition and coated substrate wherein the coating is essentially one macromolecule of homogeneous structure wherein the nitrogen atoms of the urethane groups are joined to alicyclic rings and/or straight aliphatic chains and the main polyurethane chains are crosslinked by three types of crosslinkages; via isocyanate residues and triol or tetrol residues, reactive upon curing by exposure to heat; via double bonds in vinyl compounds reactive, upon curing by exposure to radiation, with acrylo groups incorporated as acrylate esters into the polyurethane structures; and via urea groups formed by action of moisture upon isocyanate groups which are unreacted in the heat and radiation curing steps. On an equivalent weight basis, the ratio of all double bond crosslinkages: urethane crosslinkages is between 1.0 and 2.5; the content of urethane groups in the main polyurethane chains is from 40% up to no more than 70% of total equivalents of originally present isocyanate groups; the content of urethane crosslinkages on the same basis is 20–40%, and the content of urea groups on the same basis is about 5 to 25%. One particularly suitable substrate is resilient, foamed, embossed polyvinyl chloride yard goods such as used for floor covering.

8 Claims, No Drawings

STAIN RESISTANT, ABRASION RESISTANT POLYURETHANE COATING COMPOSITION, SUBSTRATE COATED THEREWITH AND PRODUCTION THEREOF

BACKGROUND

This invention relates to polyurethane coatings, especially upon resilient, embossed vinyl sheet floor covering materials, from compositions which can be rapidly cured using a combination of heat, produced for example by infrared radiation ("IR"), and actinic radiation especially ultraviolet ("UV") radiation; then exposed to the action of isocyanate-reactive substances, such as moisture, to convert a predetermined content of isocyanate groups in the polyurethane into urea groups.

The prior art has disclosed polyurethane coating compositions, and vinyl sheet coated therewith, wherein the coating composition consists essentially of low molecular weight resinous urethane polymers (often called in the art "oligomers" or "prepolymers"), terminated by isocyanate groups and curable at elevated temperatures by action of moisture; and as an improvement on these coating compositions, compositions curable entirely by actinic radiation (particularly UV) consisting essentially of photopolymerizable ingredients, including an unsaturated resinous compound (preferably a urethane oligomer) having at least two photopolymerizable ethylenically unsaturated groups per molecule (preferably of the acrylic type), a photo reactive monomer, a multifunctional monomer solvent and crosslinking agent, and a photoinitiator (U.S. Pat. No. 4,100,318, col. 2, lines 42-50 and col. 11, lines 32-50 of McCann et al. for Actinic Radiation Cured Coating for Cushioned Sheet Goods and Method). More particularly, this patent discloses such coating compositions based on acrylourethane oligomer from isophorone diisocyanate and hydroxyethyl acrylate; plus a monomeric acrylate, a glycol diacrylate and a photoinitiator; and cured by exposure to UV radiation (Example II at col. 14, and col. 19, line 3-col. 20, line 14).

U.S. Pat. No. 4,216,267 of Aug. 4, 1980 to Lorenz et al. for "Flexible Substrates Containing A Radiation Curable Coating Composition" is of interest for its exemplification of radiation curable acrylourethane compositions derived from specifically isophorone diisocyante or 4,4'-dicyclohexylmethane diisocyanate (Examples 1-3, 5,7-11,13-16).

U.S. Pat. No. 3,935,330 of Jan. 27, 1976 to O. W. Smith et al. for "Two-Step Coating Process" is of interest in disclosing coating compositions curable by irradiating in one step and heating in a second step. These coatings consist essentially of (1) a "thermoset crosslinker" such as a polyfunctional epoxide or urea-formaldehyde or melamine-formaldehyde reaction product (col. 7, lines 2-6); (2) a reactive solvent sensitive to both thermal and radiation crosslinking such as acrylates of monofunctional or polyfunctional alcohols e.g. 2-hydroxyethyl acrylate; trimethylol propane mono or diacrylate, pentaerythritol mono-or di-or triacrylate, or "urethane oligomers containing both an (OH) group and a (CH=C) group" (col. 7, lines 56-63 and col. 8, lines 24,26-28, 37-38, 43-50); and (3) a radiation sensitive component such as isodecyl acrylate, 1, 4-butanediol diacrylate and trimethylol propane triacrylate (col. 8, line 55—col. 9, lines 14-15, 21-23). Also "small amounts of other crosslinkable polymers" (col. 10, line 7) can be used including "known polyureas and polyurethanes" (col. 10, line 67-68).

A valuable innovation is set forth in U.S. patent application Ser. No. 023,107 of S. N. Varadhachary et al., filed Mar. 23, 1979 now abandoned. A conventional or an acrylo-modified polyurethane resin provides available isocyanate groups and a vinyl resin includes a chemical compound possessing hydroxy or other isocyanate-reactive groups. When the resins are exposed, while in contact, to curing conditions there is sufficient chemical inter-reaction between them to create a strong and permanent primary chemical bond between them. In particular, in Example I, an acrylated polyurethane resin and a glycol diacrylate are employed in a coating composition, providing 1.93 weight percent of available NCO therein, which is applied to a wet thickness depth of about 1.5 mils (0.04 mm) upon the polyvinyl chloride wear layer of a foamed, chemically embossed polyvinyl chloride composite sheet; which wear layer composition contains about 11% by weight of a linear polyester having hydroxyl value of 107 mg. KOH/g, i.e. hydroxyl equivalent weight of 523 (available commercially as Oxyester T 1136 (V)); and the coating is cured by passage through a UV unit.

SUMMARY AND ADVANTAGES OF THE INVENTION

In accordance with the present invention, a homogeneous, unitary crosslinked polyurethane coating is provided combining good retention of gloss as shown in scrubbing tests with good resistance to staining by common staining substances such as tar and asphalt, and having in addition desirable flexibility, transparency, hardness, adhesiveness, and other desirable properties characteristic of known polyurethane coatings for use on various substrates, particularly on resilient vinyl yard goods. Also the coatings are useful on resilient tile, on wall coverings, on upholstery materials, on simulated leather, and the like. Also provided are compositions curable to form such coatings, and the coated vinyl sheets and methods of producing the sheets.

In our extensive studies of coatings and especially polyurethane coatings for vinyl sheet, particularly resilient polyvinyl chloride ("PVC") flooring sheet, we have observed that coatings based on acrylourethanes, cured by actinic radiation, tend to improve in staining resistance as the cure is made tighter; but tend at the same time to deteriorate in retention of gloss as shown in scrubbing tests.

The present invention provides favorable results for both the staining resistance and the scrubbing performance of clear, flexible polyurethane coatings, especially such coatings upon resilient foamed, embossed vinyl sheet and particularly on such sheet composed of polyvinyl chloride.

ESSENTIAL INGREDIENTS

In accordance with this invention, the polyurethane coatings are based on acrylated and/or methacrylated polyurethanes in which the nitrogen atoms are joined to alicyclic rings, or to straight aliphatic chains, which polyurethanes contain terminal isocyanate groups. Hereinafter the term "acrylated polyurethanes" is intended to include methacrylated polyurethanes. Moreover the coatings include residues of triols and/or tetrols functioning to crosslink isocyanate groups; and include residues of vinyl compounds especially monoacrylates, diacrylates, triacrylates and/or tetra-acrylates functioning to crosslink acrylate groups of the acrylated polyurethanes. As discussed hereinafter, chemical constitution of the polymer, and chemical constitution and proportions of its principal ingredients are important features of the invention.

ESSENTIAL PARAMETERS

An essential feature of the invention is the relative proportions of the coating ingredients. Certain critical limits result in enhancement of gloss retention at a given level of staining resistance.

The limits upon relative proportions of ingredients in the coatings of this invention are defined, most critically, by the ratio (on an equivalent basis) of crosslinkages via double bonds: crosslinkages via urethane groups (formed between the polyurethane structures of the invention and triol or tetrol residues); said ratio in accordance with this invention being between 1.0 and 2.5. For the purposes of determining this ratio, the number of equivalents of double bond crosslinkage in the coating is taken as being equal to the number of equivalents of carbon-carbon double bond in the uncured coating composition; and the number of equivalents of urethane crosslinkage in the coating is taken as being equal to the number of equivalents of hydroxyl group provided by the triols and the tetrols in the uncured coating composition. Ratios either above or below this range can give good gloss retention but do not give good stain resistance.

PROPORTIONS OF INGREDIENTS

Other essential parameters which define the polyurethane coatings of this invention are the proportions of the several types of groups formed from the isocyanate groups in the starting materials, and the nature of the diisocyanates and diols which compose the main polymer chains.

Of the isocyanate groups originally present in the diisocyanate constitutents, some appear linked as urethane groups in the main polyurethane chains, these representing on an equivalent weight bases from about 40% up to no more than 70% of the originally present isocyanate groups; some appear as urethane crosslinkages via triol and/or tetrol residues linked to isocyanate groups in the polyurethane chains, these representing about 20% to about 40% of the originally present isocyanate groups; and some appear as urea groups produced, generally by action of moisture, from isocyanate groups which are unreacted in the heat and radiation curing steps, these representing about 5 to about 25 equivalent weight percent of said originally present isocyanate groups and amounting, calculated as weight of isocyanate groups available for conversion to urea groups, to about 0.5 to 5 percent by weight of the coating. It will be evident from the foregoing that the total of isocyanate groups originally present in the diisocyanate constituents of the coating is the sum of the urethane groups in the main chains, the urethane crosslinkages, and the urea groups in the coating; all on an equivalent weight basis.

CHEMICAL CONSTITUTION OF COATING

The overall structure of polymers composing the coatings of this invention can be exemplified in simplified, diagrammatic form by the following chemical formula:

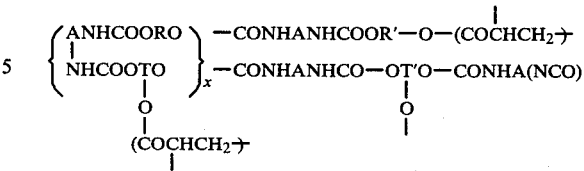

wherein the portion in large brackets represents the bulk of a polyurethane main chain in which at each occurrence "A" represents an alicyclic ring and/or aliphatic straight chain structure. The groups (ORO) represent diol residues and the group in the lower lines of the formula,

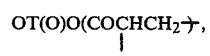

represents an acrylated triol residue, wherein acrylate is represented by

Each unsatisfied bond stroke in the acrylo groups of the acrylate residues represents addition of another double bond to the acrylo double bond to form a double bond crosslinkage. The residue OT' (O)—O—in the formula, at its second and third lines, represents a triol residue in a urethane crosslinkage. Unreacted isocyanate groups available for formation of urea crosslinkages are represented at the end of the second line of the formula as (NCO).

It will be appreciated that where triol residues are represented in the above formula, tetrol residues and/or at least some diol residues could likewise appear; that the acrylo groups and triol (or tetrol) residues could be situated in positions other than represented in the above formula and that, as above noted, the formula is intended as a diagrammatic aid to understanding of the herein invention and not as limiting the invention.

By a "homogeneous, unitary" polyurethane coating as those terms apply to this invention is meant a coating which is essentially of the same chemical composition throughout, and is essentially one macromolecule; in particular it is not composed of layers of differing structure, and it is crosslinked all the way through to essentially the same extent.

CHEMICAL CONSTITUTION OF POLYMER INGREDIENTS; PREPOLYMER

The requirements upon the structures to which the urethane nitrogen atoms are joined is important for purposes of this invention. Alicyclic ring structures are preferred, in view of their lower volatility and toxicity, but straight aliphatic chains can also be used. We believe the ring structures impart greater rigidity to the chain than would result from branched aliphatic chains or from polyether chains, thereby creating stronger chain entanglements with resulting improvement in toughness and in stain resistance. Although aromatic rings, attached to the nitrogen atoms, could likewise impart the desired chain rigidity, our tests have indicated that at most, only minor proportions of such aromatic ring compounds should be present in the polyurethane chains in the coatings of this invention; otherwise the coatings have a tendency toward yellowing. Accordingly, an essential starting material for the coatings of this invention is an alicyclic or alkylalicyclic or straight chain aliphatic diisocyanate.

A preferred diisocyanate starting material for production of polyurethane having alicyclic rings in the polyurethane chain, for the coatings of this invention, is bis(4-isocyanatocyclohexyl)methane, commercially available under the mark "Hylene W." Readily available alternatives include isophorone diisocyanate (i.e. 3-isocyanatomethyl-3,5,5-trimethylcyclohexyl isocyanate).

In forming a polyurethane "prepolymer" for purposes of this invention a diisocyanate as cited above is combined with less than the stoichiometric quantity of a diol. Diols for such production of isocyanate-terminated polyurethane prepolymers by reaction with the above diisocyanates are known, and include especially polyether diols such as polytetrahydrofuran of molecular weight averaging about 650, commercially available under the mark "TERACOL 650." In such diols, chain length of the ether moieties ranging from 3 to 8 atoms, and number average molecular weight of the diol ranging from about 200 to about 1,000 conduce to proper spacing of urethane links along the main polyurethane chain and to suitable viscosity of the eventually formed prepolymer. To obtain the desired content of urethane and (ultimately) urea crosslinkages in the coating of this invention, and to obtain the required balance among the various linkages in the final polymer, the equivalent weight proportion of diols, plus any mono-ols, employed in the prepolymers and in the coating compositions formed therewith, relative to the diisocyanate employed—and consequently the proportion of originally present isocyanate groups, reacted to form urethane groups in the main polymer chain (but not in crosslinkages with triols and tetrols)—is from about 40% up to no more than 70% expressed as hydroxyl equivalents of mono-and diols employed relative to isocyanate equivalents originally present. Too low or too high a proportion of hydroxyl groups relative to the originally present isocyanate groups in the polyurethane polymer ingredients tends to result in depreciated properties of the coating. In particular, lack of resistance to effects of scrubbing will result by reason of a lack of toughness accompanying too high a level of either thermal or radiation crosslinking (occurring when the coating composition is being cured). Such lack of toughness can be associated with low ultimate elongation of the final polymer. Moreover, toughness and resistance to scrubbing will be lacking when crosslinking is too low, since that polymer is too weak.

ACRYLATE GROUPS IN PREPOLYMER

Besides containing unreacted isocyanate groups, the polyurethane prepolymers employed in the coating compositions of this invention contain acrylate groups which provide sites for double bond linkages in the prepolymer in the coating. These groups are introduced during preparation of the prepolymer or permissibly, in part, during the curing of the coating composition, as partial acrylates of diols or polyols, especially partial acrylates of alkane or polyether di-or polyols; such as the monoacrylate of a diol or triol, or diacrylate of a triol or tetrol, or triacrylate of a tetrol, as illustrated for example by hydroxyethyl acrylate, monoacrylate of a polyether glycol, trimethylol propane diacrylate, diacrylate or triacrylate of pentaerythritol or of a pentoerythritol/alkylene oxide tetrol. Leaving one or two hydroxyl groups free in a diol or polyol, with the rest acrylated, allows further reaction of the unreacted isocyanate groups, in the earlier formed polyurethane oligomer, with said one or two hydroxyl groups; thereby linking the terminal acrylate groups of a monoacrylated diol, via formation of a urethane linkage, to the terminal isocyanate group at one end of a polyurethane chain; or similarly linking a diol residue, carrying substituent acrylate groups, between two earlier formed isocyanate-terminated, polyurethane oligomer chains. Again for purposes of achieving the required balance among the various linking functions, the extent of acrylation in such polyurethane prepolymers must be limited with reference to the isocyanate groups left unreacted and available for formation of urethane crosslinkages with triols or tetrols in the final coating; such that, as already stated, the ratio in the final coating between double bond crosslinkages and urethane crosslinkages joining polyurethane structures is between 1.0 and 2.5, and most specifically is from 1.5 to 2.0.

These acrylated, isocyanate-terminated polyurethane prepolymers can be produced by heating the ingredients with exclusion of atmospheric moisture in conventional manner, as known in the polyurethane art, at temperatures such as 30° to 50° C.

COATING COMPOSITIONS OF THE INVENTION

Besides the above-discussed prepolymers, the coating compositions of this invention consist essentially of triol and/or tetrol as thermal crosslinking agents, together with one or more catalysts of urethane formation to promote such thermal crosslinking; and of double bond compounds as radiation-responsive crosslinking agents; together with photoinitiators to promote radiation crosslinking. Sufficient free isocyanate groups are included in the coating composition to form urea crosslinkages in addition to the urethane crosslinkage and double bond crosslinkages. These urea crosslinkages appear to improve the stain resistance of the coating.

Urethane crosslinkages arise, as already stated, from triols of tetrols in the coating composition acting, under the influence of heat, as crosslinkers upon isocyanate groups provided by the polyurethane prepolymer. The triols and tetrols desirably are low molecular weight alkane triols or tetrols, or polyether alcohols representing adducts of alkane triols or tetrols with alkylene oxides, especially wherein one or a few molecules of alkylene oxide containing 2 to 5 carbon atoms in the molecule are added to each hydroxyl group of a triol or tetrol. Particularly useful as such alcohols are those having molecular weight not over 1,000 such as 2-ethyl-2-hydroxymethyl-1,3-propane diol (also called trimethylol propane, "TMP"), isopropylene tetra-ether of pentaerythritol, butane triols, pentane triols, hexane triols, hexane tetrols, and the ether type polyols formed from the foregoing alcohols by addition of one or a few molecules of alkylene oxides having from 2 to 5 carbon atoms, especially ethylene oxide and/or propylene oxide, added to one or more of the hydroxyl groups in the alcohol. To promote this crosslinking action, a catalyst of urethane formation is used, for example, dibutyltin dilaurate or other than such catalyst.

The double bond crosslinkages, which are one of the essential features of the final coating of this invention, result from vinyl groups of the acrylate moieties in the acrylated polyurethane prepolymer ingredients of the coating compositions (which acrylation can be effected in part during the curing of the composition), interacting with each other and/or with other vinyl groups introduced into the coating composition. At least about one-fourth of these "other" added vinyl groups, acting as double bond crosslinkers, are generally but not necessarily introduced as a monoacrylate, diacrylate, triacrylate or tetra-acrylate of respectively a diol, a triol, or a tetrol into the coating composition. Illustrative useful monoacrylates, diacrylates and polyacrylates are isodecylacrylate, 1,6-hexanediol diacrylate, tetraethylene glycol diacrylate, diacrylate of bisphenol-A diepoxide, diacrylates of butane diols or pentane diols or hexane diols, trimethylol propane triacrylate, pentaerythritol tetra-acrylate. Said "other" added vinyl groups can also be provided by vinyl compounds such as vinyl acetate, vinyl pyrrolidone, alone or together with one or more acrylates such as the above.

In addition to the acrylated, isocyanate-terminated urethane prepolymers, the triol or tetrol heat-responsive urethane-forming crosslinker, and catalyst therefor, and the mono-, di-or polyacrylate or other vinyl group radiation-responsive crosslinker of our coating compositions, a photoinitiator of double bond addition is a necessary ingredient to accomplish the radiation curing via linking of double bonds in a practical time. Suitable photoinitiators are well known in the prior art, various ones being commercially available. Examples include benzoin and its alkyl ethers, especially the isobutyl ether; benzophenone and derivatives thereof, and substituted acetophenones. The choice of concentration of photoinitiator to be used appears to be a significant variable, in that when using concentrations in the upper range of conventional practice (specifically 3 to 4 weight percent of benzoin isobutyl ether) in a test of a coating composition like those of this invention but with a higher double bond:urethane group crosslinkage ratio, coatings having lower scrub resistance were obtained, than from the same coating composition except containing about 1.5 weight percent of the photoinitiator. The result indicated that the concentration of initiator should be chosen to give a radiation cure at a relatively low rate within conventional limits, such as curing with about 5 seconds or more exposure to 200 watts per inch of UV light. We believe that as usual in double bond polymerizations, longer chains of double bond linkages are formed as initiator concentrations are reduced; and thereby toughness of the resulting polymer is promoted.

DESIRABLE CONVENTIONAL ADDITIVES IN COATING COMPOSITION

As known in the prior art, the coating compositions of the invention can contain one or more of various desirable but non-essential additive ingredients such as an inhibitor of double bond addition to stabilize the composition for storage, e.g. tertiary aromatic amine types, phenothiazine; a surfactant to reduce interfacial tension between the coating composition and the substrate, thus improving the spreading of the composition over the substrate surface, e.g. a silicone-based or fluorohydrocarbon-based surfactant; flow control and leveling agents; dye-stuffs; pigments, and fillers; plasticizers and lubricants.

PREPARING COMPOSITION AND COATING SUBSTRATE

The coating composition is made up by blending ingredients as above specified, suitably under dry air and at a temperature such as 30°-50° C., as for prepolymer preparation; and the composition is applied as a film at desired thickness, say from 0.5 to 5 mils (0.013 to 0.13 mm) over the surface of the substrate, for example by a conventional roll coater, gravure coater, or curtain coater or other type of coater. If desired, the viscosity of the compostion can be reduced by including therein, a quantity of a suitable diol ingredient (up to the amount needed for balancing the free isocyanate) or of a vinyl compound ingredient, especially a polyether glycol or a monoacrylate thereof, which ingredient reacts under the influence of either heat or radiation or both, so as to combine into a unitary coating with the other ingredients of the coating composition; as well as serving as solvent or plasticizer to reduce the viscosity of a coating composition to the desired level for coating the substrate.

The coating compositions and coatings of this invention are particularly well adapted for use on known vinyl polymer sheet materials, especially such material to be used as floor covering, including resilient foamed embossed vinyl sheet. Suitable vinyl sheet for various uses of this invention can be, for example, composed of polyvinyl chloride or copolymers of vinyl chloride with vinyl acetate; or in general, any vinyl polymer. The viscosity of the coating composition should be adjusted for such use by choosing a suitable chain length of the diol ingredients of the prepolymer (as previously mentioned) and/or by including a reactive solvent or plasticizer, especially a polyether glycol or monoacrylate thereof as just discussed, in the coating composition. At suitable viscosity, the coating composition will be spreadable on the sheet by the means adopted for that purpose but will have enough viscosity (and/or will be sufficiently thixotropic) to resist running off, as from high to low points of a foamed embossed surface.

CURING THE COATING COMPOSITION

In accordance with this invention, the subject coatings are obtained by curing under the separate influence of heat and actinic radiation, and by the action of moisture, acting on the above described film of coating composition containing acrylated isocyanate-terminated urethane prepolymer; having a predetermined proportion of free isocyanate to allow reaction with moisture; containing triol or tetrol as thermal crosslinker of polyurethane chains via isocyanate groups; together with a catalyst of urethane formation; and containing mono-, di-or polyacrylate together with a photoinitiator for crosslinking acrylate groups in the acrylated polyurethane under exposure to actinic radiation.

Preferably in this invention the curing by heat is carried out ahead of the curing by radiation whereby, we find, a better adhesion can be obtained between the coating of the invention and a vinyl polymer sheet substrate. This difference may be due to greater mobility of isocyanate groups during heat curing than during and after radiation curing, allowing isocyanate groups to penetrate more readily into the underlying vinyl polymer and form bonds or entanglements therewith. However, we do not intend to be bound by any theory.

The heat for heat curing can be provided by conventional means such as a gas fired oven. Preferably heat is provided by an infrared heat source in an enclosed space through which the substrate, bearing the composition to be cured, passes.

The heat curing temperatures in an oven can range from about 50° to about 150° C. for example. Using an infrared heat source, the surface temperature of the composition can be in similar ranges. The time and temperature of heat curing should be sufficient at least to convert the film of coating composition, when cooled to room temperature, to a solid or partially solidified tacky substance. For practical purposes, use of a catalyst of urethane formation is required to reduce the necessary exposure to heat, and appears also to reduce tackiness in the final coating. Such catalysts are well known; and the particular choice of catalyst is not a feature of the invention.

The tackiness of such cured film is attributable to its content of unreacted hydroxyl groups. During the subsequent curing by exposure to actinic radiation, the free hydroxyl groups continue to react with the unreacted isocyanate groups provided in the prepolymer, so that tackiness is reduced.

The radiation exposure which follows the heat cure advances the curing of the composition, reducing the tackiness, and strengthening and toughening the polymer coating. Although other forms of radiant energy sources could be used, the preferred source is a conventional medium pressure mercury lamp unit operating at about 200–300 watts, per inch at the lamp surface, producing UV radiation (and also heat). Typically two such lamps are set in an enclosed space, one following the other, at right angles to the travel of the substrate bearing a film of the coating composition. A flow of inert gas such as dry nitrogen is maintained through the lamp unit to provide an inert atmosphere therein. Such UV lamp unit generates heat and should be cooled to avoid development of temperatures which would damage the lamps. The time of exposure is typically about 5 to 20 seconds and should be at least sufficient to leave the surface at most only slightly tacky.

As for use of a catalyst of urethane formation, use of a photoinitiator is necessary for practical purposes. Again, such initiators are well known, and the particular choice of initiator is not a feature of the invention.

One function of the excess of isocyanate groups, provided in the coatings of this invention, is to react with unreacted hydroxyl groups whereby tackiness is controlled. Those excess isocyanate groups, still unreacted, react with moisture, e.g., provided in the environment, and thereby form additional linkages taking the form of urea groups.

EXAMPLE

The example which follows is illustrative of this invention and of the best mode contemplated by the inventors for carrying out the same, but is not intended as limiting thereof.

(A) Prepolymer

An isocyanate-terminated acrylated polyurethane prepolymer was prepared by heating, under conventional conditions, commercially available bis (4-isocyanatocyclohexyl) methane available under the mark "HYLENE V," in a quantity containing 1.5269 equivalent of isocyanate groups (—NCO) together with a diacrylated tetrol. The tetrol used was a commercially available adduct of pentaerythritol and propylene oxide, i.e. an isopropylene polyether of pentaerythritol, of molecular weight about 400, available under the mark "PLURACOL PLUS 450." This diacrylated tetrol, it will be understood, averages two hydroxyl groups and two acrylate groups per molecule. The equivalents of hydroxyl groups in the quantity of diacrylated tetrol taken were 0.3752 equivalents; hence about 25% of the isocyanate groups in the diisocyanate were reacted to form this urethane prepolymer.

(B) Coating Composition Formulations

A polyurethane coating composition was prepared in conventional fashion using the following ingredients (trademarks and/or trade names are in parentheses and quotation marks).

| Ingredient | Parts by Weight |
| --- | --- |
| Prepolymer of Part (A) above | 15.0 |
| Trimethylol propane | 1.14 |
| Bisphenol-A diepoxide ("EPOCRYL 370"), Diacrylated | 2.99 |
| Monoacrylated polytetramethylene polyether glycol - the glycol has molecular weight about 650, hydroxyl number 173, low acid number ("TERACOL 650") | 13.78 |
| Fluorohydrocarbon surfactant ("FLUORAD 430") | 0.29 |
| Isobutyl ether of benzoin ("VICURE-10") | 1.0 mL |
| Urethane catalyst ("T12") | 2 drops |

It will be understood that the trimethylol propane is a triol functioning as thermal crosslinking agent by interaction with terminal isocyanate groups; the diacrylated bisphenol-A diepoxide functions, upon exposure to UV radiation, to crosslink acrylate groups in the prepolymer provided by the diacrylated tetrol ingredient thereof; the monoacrylated glycol reacts with isocyanate and because it contains a double bond it is also a radiation-responsive crosslinking agent; the surfactant promotes uniform spreading of the composition upon a substrate; the benzoin ether is a photoinitiator and the urethane catalyst aids curing by heat.

(C) Applying and Curing the Coating Composition

The foregoing coating composition was applied to a resilient, foamed embossed vinyl sheet, designed for use as vinyl floor covering by a known coating technique.

Then the coated sheet was passed by a conveyor through a first enclosed passage beneath an infrared heater and through a second enclosed passage beneath ultraviolet lamps.

The temperature at the coated surface of the vinyl sheet passing under the infrared heater rose to about 180° F. (about 82° C.). When examined in the air upon leaving the infrared heating passage, the surface of the coated vinyl sheet was found to be quite tacky, which is attributable to unreacted monomer and the hygroscopicity of hydroxyl groups still remaining unreacted in the coating.

In the passage providing UV exposure, two tubular, cooled, medium pressure mercury lamps were situated one after the other and transversely to the direction of movement of the conveyor. The first was operated at 200 and the second at 300 watts per inch at the lamp surface. The axes of the lamps were spaced ca. 9 inches (23 cm) apart, and ca. 3 inches (7.5 cm) above the surface of the coated sheet passing beneath them. The length of this passage for UV exposure was 18 inches (0.45 m.) and the rate of advance of the conveyor was 20 feet (6.1 m) per minute. A flow of dry nitrogen was maintained in this passage to displace air and sweep out any volatiles.

The resulting coating was somewhat tacky in moist air but became progressively less so on aging, as excess isocyanate groups therein continued to combine with unreacted hydroxyl groups of polyol and with moisture.

(D) Characteristics of the Cured Coating

In the prepolymer, as above mentioned, the proportion of originally present isocyanate groups —i.e. isocyanate groups provided by the bis (4-isocyanatocyclohexyl) methane starting material—reacted with the diacrylated tetrol ingredient to form low molecular weight polyurethane was about 25%. The remainder of the urethane groups in the main polymer chains of the final cured coating (not including urethane crosslinkages) are derived from the unreacted isocyanate groups remaining in the prepolymer by reaction with the hydroxyl groups of the monoacrylated glycol, TERACOL 650. These urethane groups correspond to about another 25% of the originally present isocyanate groups from the diisocyanate starting material.

This leaves about 50% of the original isocyanate groups free, and available for thermal crosslinking with hydroxyl groups of the trimethylol propane ingredient of the coating composition and for reaction with moisture. The quantity of trimethylol propane used in this example was sufficient to react in the thermal curing step with about 33% of the originally present isocyanate groups. Free isocyanate groups remained present during and after the thermal curing step; accordingly the hydroxyl compounds in the coating composition formed urethane groups practically in the theoretical proportions. There remained about 17% of the original isocyanate groups available for reaction with moisture to form urea crosslinkages (i.e. on a weight basis, about 1.5 wgt.% of unreacted isocyanate was available for conversion to urea linkages in the cured coating).

Referring to the equivalent weight ratio of double bond cross linkages:urethane group crosslinkages in the coating, the number of equivalents of double bond crosslinkages in the uncured coating composition of this example is calculated as the sum of equivalents of double bonds in the quantity of prepolymer ingredients used plus equivalents of double bonds in the quantities used of other coating composition ingredients; or 0.01865 equivalent in the acrylated prepolymer plus 0.01233 equivalent in the diacrylated diepoxide plus 0.01957 equivalent in the monoacrylated glycol. The number of equivalent weights of hydroxyl groups in the quantity of trimethylol propane used is 0.02552 equivalents. Hence the ratio on an equivalent weight basis, calculated from the foregoing figures, for double bond crosslinkages: urethane group crosslinkages is 0.05055/0.02552=1.98, i.e. just below 2.0.

Tests were made on the coating of this Example for retention of gloss as measured by reflectivity retention after scrubbing (Gardner test), and for staining resistance after 30 minute exposure to a 70/30 mixture (by weight) of asphalt and coal tar (representive of stains likely to be found on flooring, due to foot traffic.) In the scrubbing test a good gloss retention of about 80% (i.e. about 20% reduction of the initial reflectivity) was found; and in stain resistance a good value of about 3 was recorded (on a scale from 0 for no observable staining, to 8 for a poor level of staining).

In two comparison tests in which the reactants were modified, in particular by using as urethane crosslinker a tetrol, viz, isopropylene polyether based on pentaerythritol ("Pep 650") and using 2-hydroxylethyl acrylate to form the acrylated polyurethane ingredients, and isodecyl acrylate plus either 1,6-hexanediol diacrylate (Test A) or trimethylol propane triacrylate (Test B) as the added sources of double bonds in the coating composition, the ratio of double bond crosslinkages:urethane group crosslinkages was about 3.5 (Test A) and about 4.2 (Test B); and although the Gardner scrub test gave gloss retention rated "good" to "very good", the results in the stain test were rated "poor" or "bad". When in like tests, acrylated polyurethane was used with only the polyether tetrol as a crosslinker, the ratio of double bond crosslinkages:urethane group crosslinkages were about 0.4, and again the Gardner scrub test was "very good" but stain was "bad."

SUMMARY

Recapitulating the essential features of this invention, they are:

(1) A polyurethane coating, on a substrate, consisting essentially of a homogeneous, unitary, crosslinked polyurethane wherein the nitrogen atoms of the urethane groups are joined to alicyclic rings and/or straight aliphatic chains and the main polyurethane chains are crosslinked by three types of crosslinkages. One type consists essentially of crosslinks between polyurethane structures, via isocyanate residues and triol or tetrol residues forming urethane group crosslinkages linking terminal alicyclic rings in the polyurethane. The second type of crosslinkage consists essentially of crosslinks, between polyurethane structures, deriving from double bonds in vinyl compounds reacted with acrylate moieties which are incorporated into the polyurethane structures as acrylate esters of diol, triol, or tetrol residues. These -ol residues are linked as urethanes to the polyurethane structures. Urea groups form the third type of crosslinkage in the coating, linking terminal alicyclic rings. On an equivalent weight basis, the ratio of all the double bond crosslinkages:urethane crosslinkages joining urethane structures, formed by triol or tetrol residues, is between 1.0 and 2.5, where the number of equivalents of double bond crosslinkage in the coating is taken as being equal to the number of equivalents of carbon-carbon double bond in the uncured coating composition and the number of equivalents of urethane crosslinkage in the coating is taken as being equal to the number of equivalents of hydroxyl group provided by the triols, and the tetrols in the uncured coating composition. Additional important parameters defining the coating of the invention are a content of urethane groups in the main polyurethane chains amounting, on an equivalent weight basis, to about 40% up to no more than 70% of the total of isocyanate groups originally present in the diisocyanate constituents; a content of urethane crosslinkages amounting on the same basis to between about 20 and about 40 equivalent weight percent; and a content of urea groups amounting to between about 5 and about 25 equivalent weight percent of the total of isocyanate groups originally present in the diisocyanate constituents. The groups which are unreacted in the curing by heat and radiation and which are available for formation of urea groups amount to about 0.5 to about 5 percent by weight of said coating. Moreover, in said coating the vinyl groups, other than those of acrylate groups incorporated by urethane links in the polyurethane structures, are combined via double bond linkages with each other or with said acrylate groups incorporated in the polyurethane structures. Generally at least about one-fourth of said "other" vinyl groups are provided by an acrylate of a mono alcohol, by a diacrylate of a diol, by a triacrylate of a triol or by a tetra-acrylate of a tetrol.

The nature of the coating compositions of the invention and of the coated substrates will be apparent from the foregoing description of the coating. The coatings of the invention are particularly adapted for use on foamed vinyl flooring yard goods.

Production of the coatings from the coating compositions involves a three-fold curing operation: thermal cure, radiation cure, and moisture cure preferably in that order. The thermal cure causes triols and tetrols in the coating composition to crosslink polyurethane structures therein by formation of urethane links between hydroxyl groups and unreacted isocyanate groups. The radiation cure causes crosslinking via addition of double bonds of vinyl compounds, including those of acrylate groups incorporated in the polyurethane structures (via urethane links between hydroxyl groups in the acrylate compound and isocyanate groups in the polyurethane structure). The moisture cure causes isocyanate groups, unreacted in the curing steps to link together with formation of urea groups.

What is claimed is:

1. Homogeneous, unitary, crosslinked polyurethane coating on a substrate wherein the nitrogen atoms of the polyurethane structures are joined to alicyclic rings or to straight aliphatic chains and the crosslinkages consist essentially of crosslinks between polyurethane structures, via isocyanate residues and triol or tetrol residues forming in combination, urethane group crosslinkages in the polyurethane structures; and crosslinks between polyurethane structures, deriving from double bonds in diacrylates, triacrylates or tetra acrylates and acrylate moieties which esterify alkane or polyether diol, triol or tetrol residues, which residues are linked as urethanes to the polyurethane structures; said coating also having urea groups linking the polyurethane structures; and wherein on an equivalent basis the ratio of double bond crosslinkages:urethane group crosslinkages joining polyurethane structures, formed by triol or tetrol residues, is between 1.0 and 2.5; where the number of equivalents of double bond crosslinkage in the coating is taken as being equal to the number of equivalents of carbon-carbon double bond in the uncured coating composition, and the number of equivalents of urethane crosslinkage in the coating is taken as being equal to the number of equivalents of hydroxyl group provided by the triols and the tetrols in the uncured coating composition; and in said coating the content of urethane groups in the main polyurethane chains amounts on an equivalent weight basis to about 40% up to no more than 70% of the total of urethane groups in the main polymer chains plus urethane crosslinkages plus urea groups present in said coating; the content of urethane group crosslinkages, formed from triol or tetrol residues, amounts to between about 20 and about 40 equivalent weight percent of said total of main chain urethane groups, urethane crosslinkages and urea groups and the content of urea groups in said coating amounts to between about 5 to about 25 equivalent percent of the total of said urethane main chain groups, urethane crosslinkages and urea groups and calculated as weight of unreacted isocyanate groups available for conversion to urea groups, amounts to about 0.5 to about 5 percent by weight of said coating; and in said coating, the vinyl groups other than those of acrylate groups incorporated by urethane links in the polyurethane structures, are combined via double bond linkages with each other and with said acrylate groups incorporated in the polyurethane structures.

2. Coating of claim 1 wherein said ratio of double bond crosslinkages:urethane crosslinkages is between 1.5 and 2.0.

3. Coating composition consisting essentially of:
(1) a low molecular weight, isocyanate—terminated, acrylated polyurethane prepolymer based on (a) an alicyclic or alkylalicyclic diisocyanate, (b) a polyether diol of number average molecular weight of about 200–1,000 in which the ether moieties have chain length of 3 to 8 atoms, and (c) a partial acrylate of a diol or polyol; and of (2) a triol or tetrol of molecular weight not over 1,000; and of (3) at least one added compound providing vinyl group; together with a catalyst of urethane formation and a photoinitiator of double bond addition.

4. Coating composition of claim 3 in which the diisocyanate is at least one member of the group consisting of bis (4-isocyanatocyclohexyl) methane and 3-isocyanatomethyl-3,5,5-trimethylcyclohexyl isocyanate and at least one fourth of the vinyl groups provided by such added vinyl compound are provided by a monoacrylate, diacrylate, triacrylate or tetra-acrylate of respectively a mono alcohol, a diol, a triol or a tetrol.

5. Process of curing a coating composition of claim 3, applied upon a resilient foamed embossed vinyl sheet as substrate, comprising exposing said composition on the substrate first to heat, to cure the same to a tacky state when at room temperature; then under a dry atmosphere to actinic radiation to advance the curing of the composition to a stage where it is at most only slightly tacky; and finally to moisture which converts isocyanate groups, remaining unreacted in the heat and radiation curing steps, to urea groups.

6. Process of claim 5, wherein the heat is provided by an infrared heat source and the radiation is ultraviolet radiation provided by a medium pressure mercury lamp unit operating at about 200–300 watts per inch at the lamp surface.

7. Resilient, foamed embossed vinyl sheet bearing the coating of claim 1.

8. Sheet of claim 1 wherein the vinyl sheet is composed of polyvinyl chloride.

* * * * *